(No Model.)

J. M. PIRTLE.
PULVERIZING ATTACHMENT FOR PLOWS.

No. 461,846. Patented Oct. 27, 1891.

Witnesses
M. Fowler
Wm. Bagger

Inventor
James M Pirtle
By his Attorneys,
C. A. Snow & Co.

THE NORRIS PETERS CO., PHOTO-LITHO., WASHINGTON, D. C.

UNITED STATES PATENT OFFICE.

JAMES M. PIRTLE, OF ARDEOLA, MISSOURI.

PULVERIZING ATTACHMENT FOR PLOWS.

SPECIFICATION forming part of Letters Patent No. 461,846, dated October 27, 1891.

Application filed May 9, 1891. Serial No. 392,160. (No model.)

*To all whom it may concern:*

Be it known that I, JAMES M. PIRTLE, a citizen of the United States, residing at Ardeola, in the county of Stoddard and State of Missouri, have invented a new and useful Pulverizing Attachment for Plows, of which the following is a specification.

This invention is an improvement in plow attachments, and has for its object to provide an attachment for plows, by the use of which a drag or the like may be drawn after the plow over the loosened earth for the purpose of pulverizing the same.

Furthermore, the invention has for its object the production of a simple, inexpensive, and durable harrow attachment for plows, which may be readily converted into a drag or pulverizer, and, furthermore, to provide an attachment for plows which may be readily attached and detached from the same.

With these objects in view the invention resides in the various novel details of construction and in the combination of parts hereinafter fully described, and particularly pointed out in the claims.

Figure 1:
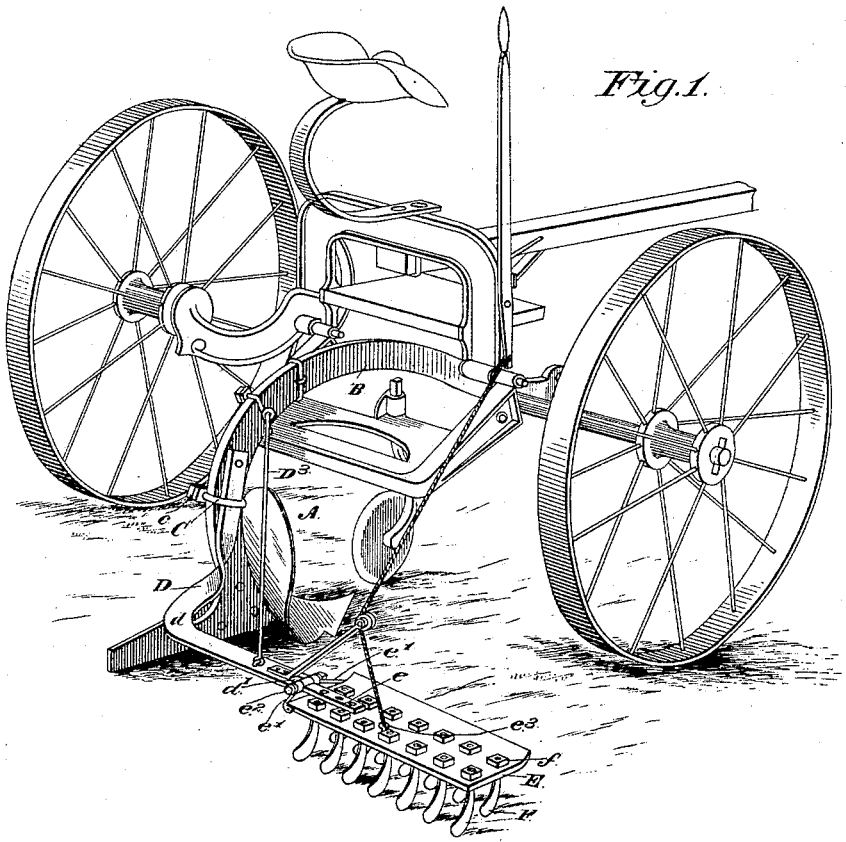
Figure 2:
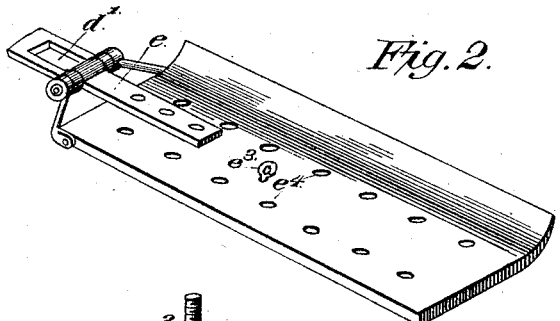
Figure 3:
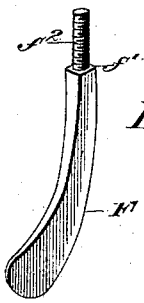

In the drawings, in which I have illustrated my invention and in which like letters of reference indicate corresponding parts, Figure 1 is a perspective view showing my device attached to a plow. Fig. 2 is a similar view of the device used as a drag, and Fig. 3 is a detail view of one of the parts.

In the drawings, the letter A designates a plow, which has a beam B. To this beam is secured, by means of the clevis C and nuts $c$, the curved bar D, the outer end of which is connected with the plow-beam by a brace $D^3$. This bar has its body curved at a sharp turn $d$, and is provided in its end with a slot $d'$, in which is pivoted the shank $e$, which extends from the drag-plate or knife-plate E. Braces $e'$ extend from the said plate E and are secured to the pivot $e^2$ on either side of the bar D. The drag-plate or knife-plate E is provided with a loop $e^3$, to which is attached a rope or the like, which passes over a pulley in the upper end of an arm attached to the bar D, and from thence to a lever pivoted to a frame of the plow or of the plow-carriage, whereby the drag-plate or knife-plate may be elevated when desired. This drag-plate or knife-plate consists of a plate of metal—such as cast-steel or the like—having its forward edge turned up, as shown, and the said drag-plate is provided with openings $e^4$, in which knives F may be secured by means of nuts $f$. These knives have shoulders $f'$ on their upper portions, from which extend threaded shanks $f^2$. The upturning of the plate, as shown at $e^3$, enables the same to ride over rough ground without being hindered in its progress by stumps, stones, or clods and without cutting into the ground.

It is of course to be understood that I may use my plate E either as a drag-plate, as described, or as a knife-plate for a harrow described, the transition from one to another being effected simply, easily, and quickly by removing the knives F from the plates E when it is desired to use the device as a drag or clod-crusher, or by securing the knives in the plate when it is desired to use the device as a harrow.

I do not desire to be limited to the precise construction shown and described; but I wish to be understood as claiming all the legitimate equivalents for the device shown, described, and claimed.

The utility and operation of my plow attachment will be evident. The device may be attached in any suitable or convenient manner—such as that described—to any kind of plow, and by so attaching the device to the plow a great saving will be effected in time, in money, and in labor.

Having thus described my invention, I claim and desire to secure by Letters Patent of the United States—

1. The combination, with a plow, of a curved bar connected detachably with the beam of the same, a drag-plate hinged at the outer end of said curved bar and having an upturned front edge, braces connecting the said drag-plate with the ends of the pivotal pin upon which it is mounted, and mechanism for raising the free end of said plate, substantially as set forth.

2. The combination, with a plow, of a curved bar connected detachably with the beam of the same, a brace connecting the outer end of said curved bar with the beam, the drag-plate hinged to the outer end of said curved bar and having an upturned front edge and detachable knives or cutters, braces connecting said plate with the ends of the pivotal pin by which it is connected with the curved bar, and mechanism for raising or adjusting the free end of said drag-plate, substantially as and for the purpose set forth.

In testimony that I claim the foregoing as my own I have hereto affixed my signature in presence of two witnesses.

JAMES M. PIRTLE.

Witnesses:
JNO. H. RICHARDSON,
W. T. PIRTLE.